Patented Nov. 5, 1946

2,410,775

UNITED STATES PATENT OFFICE 2,410,775

COLOR STABILIZATION OF VINYL HALIDE RESINS

Fred W. Cox, Cuyahoga Falls, and James M. Wallace, Jr., Akron, Ohio, assignors to Wingfoot Corporation, Akron, Ohio, a corporation of Delaware No Drawing. Application June 22, 1945, Serial No. 601,060

9 Claims. (Cl. 260—78)

This invention relates to the stabilization of vinyl halide resins, and particularly the vinyl halide resins which are polymers of at least 70 percent of vinyl halide, including the polymers of 100 percent vinyl halide and the copolymers of vinyl halides with other polymerizable mono-olefinic compounds.

Vinyl halide resins generally will discolor when heated, for example at a temperature of 100° C. or higher, and especially in the presence of iron or iron salts. It has been discovered that the addition of a small proportion of amino-guanidine or a salt of amino-guanidine will enable the resin to resist the discoloration effect for substantial periods of time.

The vinyl halide resins which may be stabilized in accordance with this invention include the polyvinyl halides, made by the polymerization of any compound of the group consisting of vinyl chloride, vinyl bromide, vinyl fluoride and vinyl iodide without the presence of other polymerizable mono-olefinic compounds. The invention is also useful in the prevention of discoloration upon heating in copolymers of from 70 to 100 percent of a vinyl halide with from 0 to 30 percent of another polymerizable mono-olefinic compound. Although any polymerizable mono-olefinic compound which is compatible with the vinyl halide in polymeric form, i. e., which forms copolymers therewith, may be stabilized, the invention is particularly useful in the treatment of copolymers of monomeric mixtures of vinyl halide and up to 30 percent of vinyl acetate, vinylidene chloride, styrene, the alkyl fumarates, the alkyl maleates, the alkyl chloromaleates, the alkyl chlorofumarates, the alkyl acrylates, or the alpha substituted alkyl acrylates. The copolymers which are of particular importance are those of 70 to 98 percent of vinyl halide and from 2 to 30 percent of said other mono-olefinic monomer. A preferred class of copolymers are those of 80 to 95 percent of vinyl halide and from 5 to 20 percent of the other monomer.

The stabilization against discoloration upon heating is effected by the incorporation of amino-guanidine or any salt of amino-guanidine. For obvious economic reasons the most useful salts of amino-guanidine are those made by the reaction of amino-guanidine with inexpensive readily available acids. Thus, the most useful salts are the hydrochloride of amino-guanidine, the bicarbonate of amino-guanidine, amino-guanidine sulfate, amino-guanidine nitrate, amino-guanidine acetate, amino-guanidine carbonate, and the hydrosulfate of amino-guanidine, although any other salt of amino-guanidine may be used. The quantity of stabilizer used will depend upon the conditions of heating to which the vinyl resin is to be subjected. If only mild heating is encountered, small amounts or even traces of the agent will yield an improved product. Although the incorporation of from 0.05 to 10 percent by weight, based on the polymer content of the resin, will produce useful compositions, generally the best results are obtained from the use of from 0.5 to 5 percent of the guanidine or salt thereof.

The stabilizing agent may be incorporated by any of several methods. It may be added to the solid resin and mixed therein by means of a roll mill or other mixing machine adapted to blend solid plastic materials. The mixing machine may be heated during the mixing operation to render the compositions more plastic. Alternatively, the stabilizing agent may be dissolved in any suitable solvent and the solution then mixed with the resin. The vinyl halide resin may be dissolved in a solvent, such as ethylene dichloride, and the stabilizing agent added to the solution and dispersed therein by means of any stirring device. If the polymers or copolymers are prepared by polymerization in an aqueous emulsion, the stabilizing agent may be added and distributed through the polymer prior to coagulation. Any other method which permits a uniform distribution of the stabilizing agent throughout the polymer may be used.

The stabilized resins may be used in the preparation of cast films or in the fabrication of molded or extruded shapes, which uses are well known to the art. The stabilized vinyl halide resins are particularly useful in the preparation of transparent or light colored articles in which discoloration upon heating is undesirable.

Further details of the invention are set forth with respect to the following specific examples.

Example 1

Each of three 10 gram samples of a copolymer of 90 percent vinyl chloride and 10 percent diethyl fumarate were milled with 2 ml. of dibutyl sebacate. Two of these samples were blended respectively with 0.2 gram of amino-guanidine sulfate and with 0.2 gram of guanidine sulfate. The third sample was used as a control for the purpose of comparison. The copolymer samples were milled separately on a laboratory-size chromium-plated roll mill for 5 minutes at 140° F. and then for 5 minutes at 212° F. The copolymers were rolled into sheets 1 mm. in thickness and specimens were cut therefrom for heat stability tests. The specimens were introduced into an oven heated at 135° C. and every half hour for 4 hours one of each type was withdrawn. It was found that the copolymer containing amino-guanidine sulfate was stabilized to the effect of the elevated temperature, while the copolymer containing guanidine sulfate and the control specimen containing no modifying agent were discolored to about the same extent.

Example 2

Using the procedure described in Example 1 the same copolymer was blended with 2 percent of amino-guanidine bicarbonate and another sample with guanidine carbonate. The effect of the addition of these modifying agents upon the heat stability of the copolymer was determined in the manner described in Example 1. After one hour of heating at 135° C. the specimen containing guanidine carbonate was discolored even more than the control specimen, containing no modifying agent, while the specimen containing amino-guanidine bicarbonate was in perfect condition.

This application is a continuation-in-part of application Serial No. 502,314 filed September 14, 1943.

Although the invention has been described with respect to specific examples, it is not intended that the details thereof shall be construed as limitations upon the scope of the invention except to the extent incorporated in the following claims.

We claim:

1. A vinyl halide resin capable of resisting discoloration upon heating which comprises a polymer of from 70 to 100 percent of a vinyl halide and up to 30 percent of another polymerizable mono-olefinic compound, said resin containing from 0.05 to 10 percent by weight based on the polymer content, of a compound of the group consisting of amino-guanidine and salts of amino-guanidine.

2. A vinyl chloride resin capable of resisting discoloration upon heating which comprises a copolymer of 70 to 98 percent of vinyl chloride and 2 to 30 percent of diethyl fumarate, said resin containing from 0.05 to 10 percent by weight based on the polymer content, of amino-guanidine.

3. A vinyl chloride resin capable of resisting discoloration upon heating which comprises a copolymer of 70 to 98 percent of vinyl chloride and 2 to 30 percent of diethyl fumarate, said resin containing from 0.05 to 10 percent by weight based on the polymer content, of a salt of amino-guanidine.

4. A vinyl chloride resin capable of resisting discoloration upon heating which comprises a copolymer of 80 to 95 percent of vinyl chloride and 5 to 20 percent of diethyl fumarate, said resin containing from 0.05 to 10 percent by weight based on the polymer content, of amino-guanidine.

5. A vinyl chloride resin capable of resisting discoloration upon heating which comprises a copolymer of 80 to 95 percent of vinyl chloride and 5 to 20 percent of diethyl fumarate, said resin containing from 0.05 to 10 percent by weight based on the polymer content, of a salt of amino-guanidine.

6. A vinyl chloride resin capable of resisting discoloration upon heating which comprises a copolymer of 70 to 98 percent of vinyl chloride and 2 to 30 percent of diethyl fumarate, said resin containing from 0.5 to 5 percent by weight based on the polymer content, of amino-guanidine.

7. A vinyl chloride resin capable of resisting discoloration upon heating which comprises a copolymer of 70 to 98 percent of vinyl chloride and 2 to 30 percent of diethyl fumarate, said resin containing from 0.5 to 5 percent by weight based on the polymer content, of a salt of amino-guanidine.

8. A vinyl chloride resin capable of resisting discoloration upon heating which comprises a copolymer of 80 to 95 percent of vinyl chloride and 5 to 20 percent of diethyl fumarate, said resin containing from 0.5 to 5 percent by weight based on the polymer content, of amino-guanidine.

9. A vinyl chloride resin capable of resisting discoloration upon heating which comprises a copolymer of 80 to 95 percent of vinyl chloride and 5 to 20 percent of diethyl fumarate, said resin containing from 0.5 to 5 percent by weight based on the polymer content, of a salt of amino-guanidine.

FRED W. COX.
JAMES M. WALLACE, Jr.